June 23, 1959     H. E. KOERNER     2,892,090
X-RAY APPARATUS

Filed May 28, 1957     3 Sheets-Sheet 1

Fig. I.

WITNESSES:
Benjamin DeWitt
Wm. B. Sellers

INVENTOR
Harry E. Koerner
BY
ATTORNEY

June 23, 1959

H. E. KOERNER 2,892,090

X-RAY APPARATUS

Filed May 28, 1957

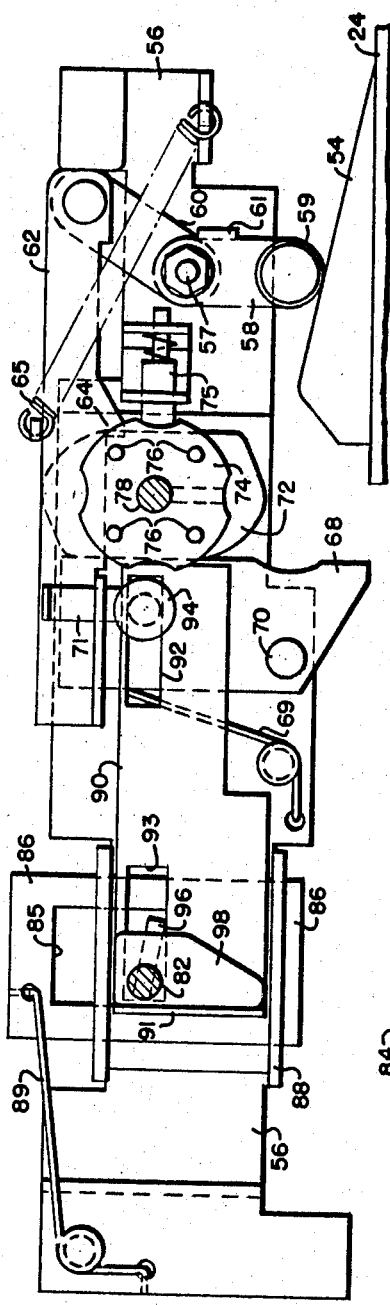

United States Patent Office 2,892,090
Patented June 23, 1959

2,892,090

X-RAY APPARATUS

Harry E. Koerner, Catonsville, Md., assignor to Westinghouse Electric Corporation, East Pittsburgh, Pa., a corporation of Pennsylvania Application May 28, 1957, Serial No. 662,056

4 Claims. (Cl. 250—66)

The present invention relates to radiographic apparatus and has particular reference to apparatus known in the art as "spot film" devices for successive positioning of photographic film to obtain a series of X-ray photographs.

In fluoroscopic diagnosis of human disorders it is desirable to photograph observed features of the anatomy as quickly as possible after visual observation. Abnormalities, such as stomach ulcers and the like, are fleetingly and uncertainly observable, thereby requiring a photographic apparatus capable of rapid and accurate recording of the X-ray image. Several apparatus having the foregoing capabilities are known to those skilled in the art and are generally referred to as spot film devices.

The known devices are usually comprised of the following elements or equivalents having substantially the same functions; a flat substantially rectangular frame or housing having a pair of spaced openings in the top surface thereof and having a carriage reciprocally shiftable within the housing for transporting a film cassette between an idle position at one end of the housing and a plurality of active positions near the second opening in the housing. The second opening in the housing floor normally contains a fluoroscopic screen and a lead glass superimposed on the fluoroscopic screen to allow visual observation of the screen while excluding the X-rays from the face and eyes of the diagnostician. The rectangular frame of the spot film device is ordinarily mounted above a conventional X-ray table on which a patient may lie. The long dimension of the spot film frame is ordinarily positioned at right angles to the long dimension of the X-ray table with the first opening in the frame being toward the rear of the table and with the second opening in the frame being disposed in alignment with an X-ray beam projected upwardly through the patient from an X-ray tube disposed within the table.

In order to obtain a series of photographs in rapid succession, it is the practice to provide an arrangement for rapidly shifting a film cassette horizontally in the spot film frame to a position in alignment with the X-ray beam.

The cassette shifting mechanism ordinarily comprises a carriage which is mounted on rollers and travels on a pair of tracks or the like within the spot film device to carry the cassette from an idle position to the photographic positions. In order to expose the four quadrants of a rectangular film successively, the cassette carrying mechanism must be first shiftable to align a first quadrant with the X-ray beam. The carriage must then be shifted to the idle position during further observation and must be immediately ready, when in said idle position, to be shifted to a second active position to align a second quadrant of the film in the exact location previously occupied by the first quadrant. After photographic exposure of the second quadrant, the cassette shifting mechanism is again operated through the same cycle, except that the cassette is laterally shifted relative to the carriage to permit the laterally adjacent third and fourth quadrants to be successively positioned in alignment with the X-ray beam for exposure thereto.

Spot film devices may be grouped into two general classes, namely those which are manually operated, and those which are power operated as by means of an electric motor.

The motor operated spot film devices are notoriously subject to faulty operation, are relatively much more expensive to manufacture and are diagnostically objectionable in that they are massive and not readily maneuverable relative to the anatomical areas to be examined. Thus, there is a distinct need in the art for a manually operated spot film device incorporating simplified and economically manufacturable cassette positioning means and control means therefor.

Accordingly, it is a principal object of this invention to provide a spot film device including an improved film cassette positioning mechanism which is less complex and hence less subject to faulty operation.

It is another object of this invention to provide an improved carriage positioning means for shifting a film successively to different exposure positions in order to sequentially expose different adjacent areas to an X-ray beam to provide a series of radiographs in a predetermined time sequential order on a single film.

It is a further object of this invention to provide a film carrier positioning mechanism in which reciprocation of the carrier actuates conditioning means for determining the subsequent repositioning of the carrier.

It is an additional object of the invention to provide an improved mechanism for controlling the longitudinal travel of a film carrier between an idle position and a plurality of active positions including means responsive to reciprocal movement of the carrier to actuate selectively conditionable stop means so that the stop means will position the film carrier sequentially in a plurality of different predetermined positions constituting a carrier shifting cycle.

It is a different object to provide manual control means for adjusting the selectively conditionable stop means to select any one of a plurality of different film carrier positioning cycles.

It is still another object of the invention to provide a spot film device of lightweight and simplified structure including means for successively positioning X-ray sensitive material in a plurality of predetermined positions relative to an X-ray beam in accordance with a predetermined sequential positioning cycle to thereby accommodate a plurality of X-ray photographs on different areas of a single piece of film.

These and other objects of the invention will be apparent from the following description taken in accordance with the accompanying drawings in which like reference characters indicate like parts, which drawing forms a part of this application and in which:

Fig. 3 is a detailed plan view of the mechanism for controlling the longitudinal travel of the carriage of Fig. 1;

Fig. 4 is a right hand side view of the mechanism of Fig. 3; and

Fig. 5 is a view similar to Fig. 3 but with the mechanism adjusted for 1-on-1 operation.

Figure 1:
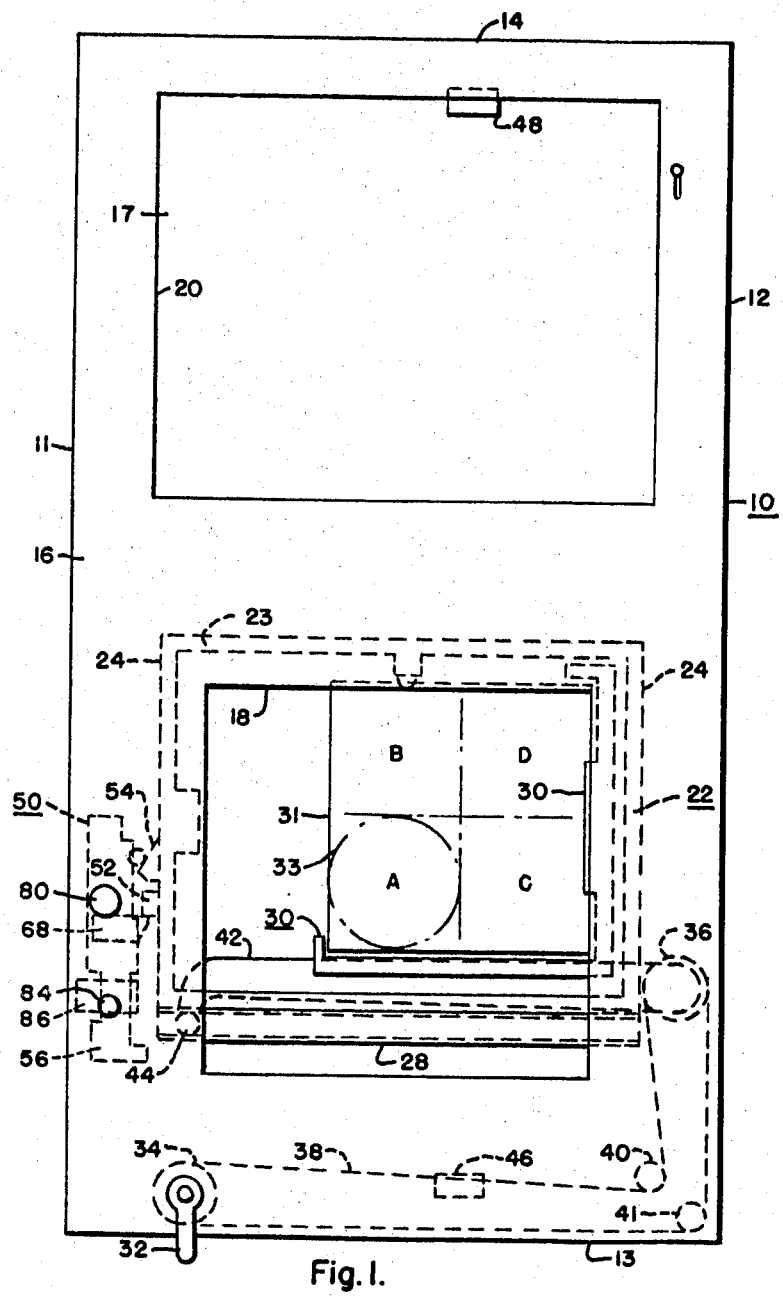
Figure 1 is a plan view of a spot film device in accordance with the invention having the conventional fluorescent screen removed to show the mechanisms thereunder.
Figure 2:
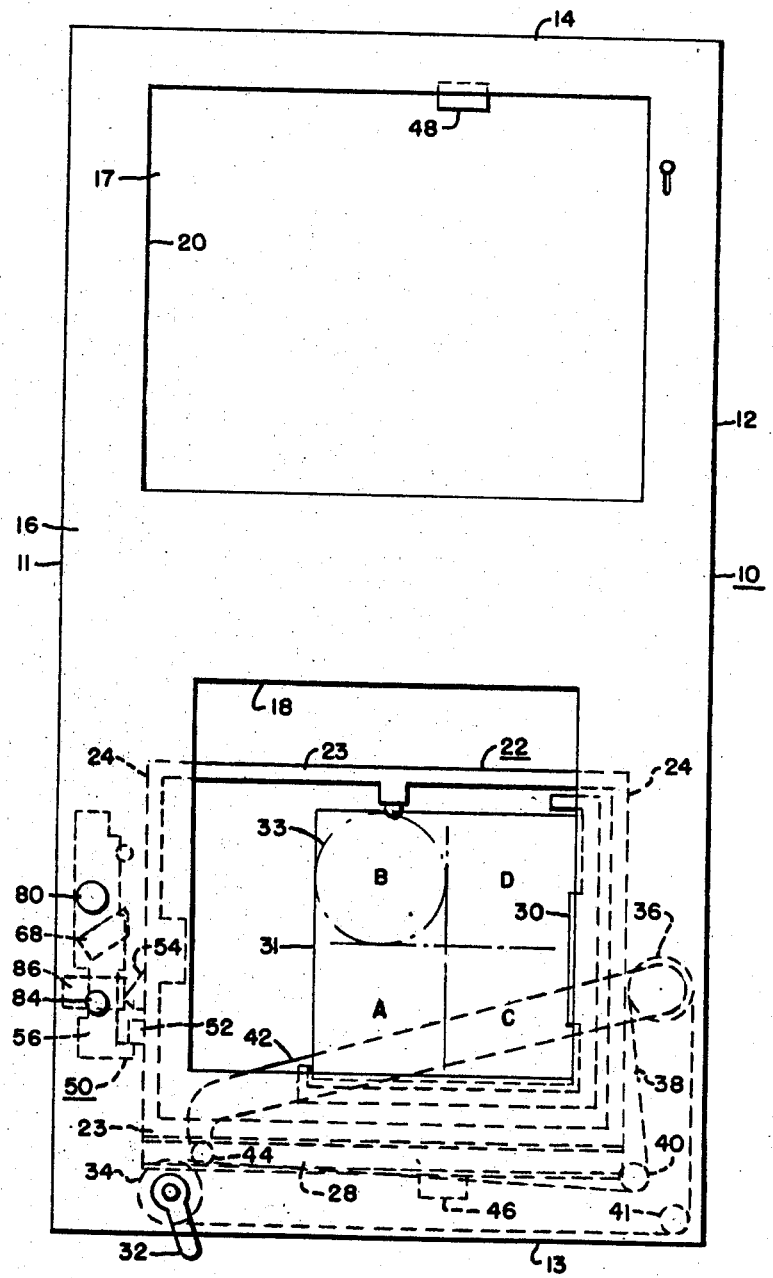
Fig. 2 is a plan view similar to Fig. 1 but having the cassette carriage positioned in a second active location.

Referring to the drawings, the body of the spot film device is a fabricated housing 10 having longitudinal side members 11 and 12, a front cross member 13, a rear cross member 14, and a top panel 16. A first opening 18 is provided in one end of the panel 16 for mounting a conventional fluorescent screen and a lead glass covering. In Figs. 1 and 2 the spot film device is shown with the fluorescent screen removed so as to more clearly exhibit the components beneath the area normally occupied by the screen. A second opening 20 at the opposite end of the panel 16 provides access to the interior of the housing to facilitate loading of film cassettes on the cassette carriage.

As shown in Fig. 1, the housing 10 is provided with a bottom cover panel 17, preferably formed of sheet steel, and having a rectangular opening in alignment with the opening 18 so as to permit the passage of an X-ray beam to the fluorescent screen from an X-ray tube located in a conventional X-ray table. The approximate area normally covered by the X-ray beam is designated diagrammatically by the circle 33 in Figs. 1 and 2. It is to be noted that the circle 33 represents the illuminated area formed by the X-ray beam. The X-ray beam 33 is normally centered with respect to the opening 18 and is normally of a size sufficient to expose one quarter section or quadrant of the cassette 31. A film cassette carriage 22 is located in the spot film device between the top panel 16 and the bottom panel 17 and is mounted for movement longitudinally of the housing 10 between an idle position in alignment with the opening 20 and a plurality of active positions in alignment with the opening 18. The carriage 22 is preferably a rectangular frame-like structure having front and rear cross members 23 and right-hand and left-hand longitudinal side members 24. The carriage is preferably equipped with rollers which engage tracks within the housing 10 in accordance with practices well known in the art.

In the present invention the carriage 22 has a channel shaped track member 28 attached to the front cross member of the carriage so as to extend transversely relative to the housing 10. Supported on the carriage 22 for movement relative thereto in a transverse direction is a substantially L-shaped cassette carrier 30 adapted to support a cassette 31 so that the transversely adjacent quadrants of the cassette may be from time to time positioned in alignment with the X-ray beam 33.

*Longitudinal travel*

The driving mechanism for longitudinally shifting the carriage 22 between opening 20 and opening 18 includes a control handle 32 journaled in the top panel 16 near the front left corner thereof, a pair of idler sprockets 40 and 41 and a driven sprocket 36 journaled for rotation on the bottom cover plate 17. The control handle 32 is provided with a driving sprocket 34. A driving chain 38 links the sprocket 34 and the driven sprocket 36 so that the sprocket 36 will be synchronously rotated in response to rotation of the handle 32. Rigidly fixed to the sprocket 36 for rotation therewith is a control arm 42 which extends laterally therefrom and which is attached to rotate in a plane substantially parallel to the plane of reciprocation of the carriage 22. The outer end portion of the control arm 42 has a roller 44 connected thereto, with the roller 44 being adapted to engage the track member 28 so that the carriage 22 is shifted longitudinally between the idle position at opening 20 and the active positions adjacent opening 18 in response to rotation of the control handle 32. The bottom panel member 17 has connected thereto a pair of stop members 46 and 48 for respectively limiting travel of the carriage 22 toward the front and toward the rear of the housing 10.

An adjustable stop mechanism 50 to be described in greater detail hereinafter is provided within the housing 10 adjacent the left-hand side member 11. The stop mechanism 50 includes a pair of control knobs 80 and 84 which project upwardly through openings in the top cover member 16 so as to be readily accessible to the left-hand of the diagnostician. The first control knob 80 may be referred to as the "4-on-1" control knob and is operative to selectively adjust the stop mechanism 50 to stop the carriage 22 in first and second longitudinally shifted active positions adjacent to the opening 18. The second control knob 84 may be conveniently designated the "1-on-1" control knob and is operative to adjust the stop mechanism 50 so that it arrests the carriage 22 in a third active position such that the center of the cassette 31 is accurately aligned with the center of the X-ray beam 33.

*The adjustable stop mechanism*

The adjustable stop mechanism 50 for controlling the longitudinal travel of the carriage is rigidly attached to the bottom panel 17 and is operative in conjunction with a tapered indexing cam member 54 which is affixed to the outside of carriage side member 24. A fixed stop block 52 is rigidly connected to the carriage side member 24 and cooperates with components of the adjustable stop mechanism 50.

Referring to Fig. 3, in which the adjustable stop mechanism is shown in detail, a mounting plate 56 is provided for supporting the components of the stop mechanism and is adapted to be rigidly attached to the bottom plate 17 of the housing 10. Mounted on a pivot stud 57 is an indexing pawl 58 having a downwardly bent lug 61 at one side thereof. Connected to the outer end of the pawl 58 is a cam follower roller 59 adapted to contact the tapered cam member 54 to pivot the pawl 58 about the stud 57. Also pivotally connected to stud 57 is a flat link member 60 having its outer end connected to a slider member 62. The slider member 62 is constrained to reciprocate longitudinally and includes a laterally projecting tooth-like shoulder portion 64. A coil spring 65 is connected between the slider member 62 and the mounting plate 56 so as to bias the slider member 62 toward the right end of the mounting plate. An adjustably positionable stop member 68 is pivotally connected to the mounting plate 56 by means of a pivot stud 70. The right-hand side of the stop member 68 normally rests against a selector cam 72 which is rotatably affixed to the mounting 56. A biasing spring 69 is provided for resiliently biasing the stop member 68 toward the selector cam 72. The selector cam 72 carries four ratchet pins 76 which project upwardly from the selector cam 72 substantially parallel to and spaced from the rotational axis thereof. The upper ends of the ratchet pins 76 are rigidly spaced by a detent cam 74 spaced above the selector cam 72 in axial alignment for rotation therewith and supported by the ratchet pins 76. The detent cam 74 has four peripherally spaced notches which operate in conjunction with a spring pressed detent plunger 75. A control shaft 78 is axially mounted in the detent cam 74 and projects upwardly therefrom through an opening in the top cover panel 16. The 4-on-1 control knob 80 is mounted on the upper end of the shaft 78 so that the shaft 78, detent cam 74, and the selector cam 72 are rotatable in response to rotation of the 4-on-1 knob.

*The one-on-one stop mechanism*

The adjustable stop mechanism 50 for differentially limiting longitudinal travel of the carriage 22 further includes a second or auxiliary adjustable stop member 86 which is selectively operative to engage stop member 52 attached to the carriage. The selective stop member 86 is a substantially rectangular flat member having a rectangular opening 85 in one end portion thereof. Stop member 86 is shiftable transversely of the stop mechanism 50 in a pair of openings in bent-up flanges 87 and 88 of mounting plate 56. A biasing spring 89 is provided for normally biasing stop member 86 to its inactive position as shown in Fig. 3. A control shaft 82 is journaled in plate 56 so as to project upwardly therefrom through an opening in the top cover panel 16. The 1-on-1 control knob 84 is affixed to the upper end of the shaft 82. The shaft 82 projects through the opening 85 of stop member 86 and carries a laterally projecting pin 96 which is operative to shift the stop member 86 when the shaft 82 is rotated clockwise to the position shown in Fig. 5. Also carried on shaft 82 is a flat semi-rectangular cam member 98. Immediately beneath the cam member 98 and above the pin 96 is a slide plate 90 having a bent-up portion 91 at the left end thereof, an elongated rectangular opening 93 through which the shaft 82 extends, and a second elongated opening 92 located directly above the 4-on-1 stop member 68. The 1-on-1 slide plate 90 is captively associated with the 4-on-1 stop block 68 by means of a machine screw 94 which extends through opening 92 and threads into stop member 68 so that stop member 68 is ordinarily free to pivot on the stud 70 with the machine screw 94 being adapted to move in a short arc in opening 92. The slide plate 90 is provided with an outwardly extending lug 71 which extends through a slot in index slider member 62 and has the ultimate end portion thereof bent up so that the slider member 62 is captively associated with the 1-on-1 slide plate 90 but is ordinarily free to move through a limited distance relative thereto.

*Four-on-one operation*

The operation of the adjustable stop mechanism 50 for successive alignment of the four quadrants of a single film with the X-ray beam 33 is substantially as follows. During a fluoroscopic examination the carriage 22 is "parked" at its inactive position in the opening 20. To begin a sequence of four exposures on a single film, the operator inserts an unexposed cassette 31 through the opening 20 into the cassette carrier 30.

The cassette carrier 30 is mounted for transverse travel within the carriage 22 with appropriate stops being provided on the carriage 22 for arresting the carrier 30 in three different transversely shifted positions in accordance with practices know in the art. The first position is substantially as shown in Fig. 1. The second transversely shifted position is that in which the center line of the cassette 31 is aligned with the longitudinal center line of the spot film housing 10 and is aligned with the X-ray beam 33. The third transverse position is that in which the carrier 30 is shifted to the left of center of the carriage so that the longitudinal center lines of quadrant C and quadrant D are aligned with the center of the X-ray beam 33. The carrier 30 may be arranged for manual transverse shifting of the cassette 31 or may be transversely shifted by any one of various devices known in the art. A preferable mechanism for shifting carrier 30 transversely within the longitudinal carriage 22 is disclosed in detail in copending application Serial No. 662,055, of Robert L. Guentner, filed May 28, 1957, and assigned to the assignee of the present application. That application discloses a tension spring arrangement for biasing the cassette carrier 30 toward the left-hand side of the carriage 22 and further discloses a mechanism for retaining the cassette carrier 30 in any selected one of the three transversely shifted positions as heretofore described.

During a fluoroscopic examination the operator may initiate a series of X-ray photographs by manually rotating the control handle 32 in the counterclockwise direction. Resulting rotation of the driven sprocket 36 will rotate the control arm 42 about its pivot, and carriage 22 will move forwardly from the idle position to the first active position in which the stop member 52 comes to rest against the adjustable stop member 68 as shown in Fig. 1. Quadrant "A" of cassette 31 will then be aligned with the X-ray beam 33 and a photograph may be made in that quadrant.

After the X-ray tube is energized and the first exposure (quadrant A) is completed, the operator turns the control handle 32 clockwise thereby returning the carriage 22 to the idle position at which time the operator may continue visual examination with the fluorescent screen. During the return stroke of the carriage 22 from the active position as shown in Fig. 1 toward the idle position, the tapered cam member 54 contacts roller 59 as shown in Fig. 3 and pivots pawl 58 in a counterclockwise direction about pivot stud 57. Lug 61 engages the edge of link member 60 and causes link member 60 to pivot in a counterclockwise direction thereby shifting slider member 62 toward the left. When slider member 62 is shifted toward the left the toothlike shoulder portion 64 will engage one of the indexing pins 76 and will rotate selector cam 72 and detent cam 74 in a counterclockwise direction through an angle of 90°. When selector cam 72 is thus rotated it engages the right-hand side of stop member 68 to pivot the stop member 68 to an angularly disposed position substantially as shown in Fig. 5. As soon as tapered cam 54 has moved past pawl 58, link member 60 and slider member 62 are returned to their normal position as shown in Fig. 3 by the action of tension spring 65. The detent cam 74 and selector cam 72 are maintained in the 90° rotated position by the action of detent plunger 75. Thus it is seen that when the carriage 22 returns to the idle position after the first exposure the stop member 68 will be held in its pivoted position.

When it is desired to record a second photograph the operator again rotates the control handle 32 to again shift the carriage 22 forward. Because of the pivoted adjustment of stop member 68 it will not engage stop member 52, and the carriage will be permitted to travel to its extreme forward position where it comes to rest against the fixed stop block 46 as shown in Fig. 2. The cassette 31 will then be positioned with quadrant B in alignment with the X-ray beam 33. After energization of the X-ray tube to expose quadrant B the operator may again return the carriage to the parked position. During the second return stroke of the carriage 22 from the active position as shown in Fig. 2 toward the parked or idle position, tapered cam 54 again actuates pawl 58 to again rotate the selector cam 72 through 90°. The selector cam is thereby rotated to its 180° position and adjustable stop member 68 is returned to its active position as shown in Fig. 3.

Prior to the third excursion of the carriage 22 the operator manually shifts the cassette carrier 30 from the position as shown in Fig. 1 to a position in which the center line of quadrants C and D are aligned with the longitudinal center line of the spot film housing 10. The operator may thereafter rotate the control handle 32 to again shift the carriage 22 forward in the same manner as previously described. Stop member 68 will be in its active position as shown in Fig. 3 and will engage stop block 52 to align quadrant C with the X-ray beam 33. During the return stroke after exposing quadrant C of the film, tapered cam member 54 will again actuate the ratchet mechanism including pawl 58 and slider 62 to rotate the selector cam 72 to its 270° position. Thus it is seen that the operator may again move the carriage 22 forward by means of handle 32; adjustable stop member 68 will be inactively located so that carriage 22 is allowed to travel to its forwardmost position to come to rest against fixed stop 46. Quadrant D of the cassette 31 will then be aligned with the X-ray beam 33 for exposure. On the return stroke, after exposure of quadrant D, tapered cam 54 will again actuate pawl 58 thereby rotating selector cam 72 through an additional 90°. Thus after four successive reciprocations of the carriage 22 it is seen that the selector cam 72 has been rotated through 360° and is hence returned to its original position as shown in Fig. 3.

*One-on-one operation*

In employing spot film devices of the type described, the diagnostician frequently desires to make one or more radiographic pictures covering the entire area of the single cassette 31. The present invention provides a manual control means for adjusting selectively conditionable stop 68 and the shiftable stop 86 so as to deactivate the stop member 68 and to retain the shiftable stop 86 in its active position as shown in Fig. 5. It is to be understood that the X-ray beam 33 may, of course, be enlarged in area by means of conventional shutter devices so that the cross-sectional area of the X-ray beam will encompass substantially the entire area of the cassette 31 during the 1-on-1 technique.

The X-ray beam, although enlarged, is still substantially centered with respect to the opening 18. In order to initiate the 1-on-1 technique of operation, the operator rotates the 1-on-1 control knob 84, clockwise. Rotation of the knob 84 and the shaft 82 causes pin 96 to engage the side of opening 85 in shiftable stop member 86 thereby shifting the stop member 86 to the position shown in Fig. 5. At the same time the flat cam 98 pressingly engages flange 91 and shifts the slide plate 90 toward the left to the position shown in Fig. 5. When slide plate 90 shifts to the left, the right-hand end of slot 92 engages the machine screw 94 and shifts the machine screw 94 toward the left thereby pivoting the adjustable stop member 68 to its inactive position as shown in Fig. 5. The selector cam 72 may then freely rotate in response to successive reciprocations of the tapered cam 54 without affecting the position of the stop member 68. That is to say, the stop member 68 is held in its inactive position by slide plate 90 during the entire period of 1-on-1 operation as selected by means of control knob 84. During that period the stop block 52 will at all times travel past the stop member 68 and will come to rest against the projecting end of the shiftable stop 86. The shiftable stop 86 is accurately located at a longitudinal position such that the cassette 31 will be accurately aligned with respect to the X-ray beam when the stop member 52 is resting against the shiftable stop member 86. So long as knob 84 is turned to the 90° clockwise position, the carriage 22 will always come to rest at an active position in which the center of the cassette is aligned with the center of the X-ray beam.

From the foregoing it will be obvious to those skilled in the art that the applicant has provided a spot film device which is easier to operate, is simplified in structure, and hence less subject to faulty operation. In addition, the mechanism for controlling the longitudinal travel of the carriage 22 includes means responsive to reciprocal movement of the carriage to actuate a selectively conditionable stop means so that the stop means will position the carrier in different predetermined active positions on each successive reciprocation.

While the present invention has been shown in one form only, it will be obvious to those skilled in the art that it is not so limited but is susceptible to various changes and modifications without departing from the spirit and scope thereof.

I claim as my invention:

1. In an X-ray spot film device including an elongated housing and a film cassette carriage movable therein to different longitudinal positions, a unitary stop mechanism for disposition within said housing to cooperate with said cassette carriage to define its different longitudinal positions, said stop mechanism comprising a mounting plate for fixed attachment to a member of the housing, a cassette stop member carried by said mounting plate movable to projected and retracted positions, stop member actuating means carried by said mounting plate, an operator's control shaft operatively connected to said stop member actuating means, and carriage-operable means carried by said mounting plate operatively connected to said stop member actuating means for actuating said stop member automatically in response to longitudinal movement of said cassette carriage.

2. In an X-ray spot film device including an elongated housing and a film cassette carriage movable therein to different longitudinal positions, a unitary stop mechanism for disposition within said housing to cooperate with said cassette carriage to define its different longitudinal positions, said stop mechanism comprising a mounting plate for fixed attachment to a member of the housing, a first cassette stop member carried by said mounting plate movable to projected and retracted positions, first stop member actuating means carried by said mounting plate, a first operator's control shaft operatively connected to said stop member actuating means, means carried by said mounting plate operatively connected to said first stop member actuating means for actuating said first stop member automatically in response to longitudinal movement of said cassette carriage, a second cassette stop member carried by said mounting plate and longitudinally spaced-apart from said first cassette stop member, said second cassette stop member being movable to projected and retracted positions, manually operable means, including a respective operator's control shaft, carried by said mounting plate to actuate said second cassette stop member, and means carried by said mounting plate operable by said manually operable means to assure retraction of said first cassette stop member upon actuation of said second cassette stop member to its projected position.

3. In an X-ray spot film device including an elongated housing and a film cassette carriage movable therein to different longitudinal positions, a unitary stop mechanism for disposition within said housing to cooperate with said cassette carriage to define its different longitudinal positions, said stop mechanism comprising an elongated mounting plate for fixed attachment to a member of the housing, a pair of cassette stop members carried on said mounting plate in longitudinally spaced-apart relationship and actuable to projected and retracted positions, a pair of operator means carried on said mounting plate and operatively connected to said pair of cassette stop members, respectively, and means carried by said mounting plate cooperative with said cassette stop members to assure that both of said members will not occupy projected positions simultaneously.

4. In an X-ray spot film device including an elongated housing and a film cassette carriage movable therein to different longitudinal positions, a unitary stop mechanism for disposition within said housing to cooperate with said cassette carriage to define its different longitudinal positions, said stop mechanism comprising a mounting plate for fixed attachment to a member of the housing, a cassette stop member pivotally mounted on said mounting plate and rockable to an effective position and to an ineffective position, a selector cam rotatably mounted on said mounting plate to actuate said cassette stop member alternately to its effective and ineffective positions, detent means carried by said mounting plate and operatively connected to said selector cam to define rotary positions thereof corresponding to positions of said cassette stop member, manually operated control shaft means operatively connected to said selector cam for manual turning movement of same, and pawl-and-ratchet means carried by said mounting plate operatively connected to said selector cam for automatic actuation thereof responsively to longitudinal movement of the cassette carriage.

References Cited in the file of this patent

UNITED STATES PATENTS

| | | |
|---|---|---|
| 2,679,599 | Stuhlman | May 25, 1954 |
| 2,811,648 | Leishman et al. | Oct. 29, 1957 |
| 2,817,766 | Leishman | Dec. 24, 1957 |
| 2,834,890 | Bastin et al. | May 13, 1958 |